United States Patent [19]
Desai et al.

[11] Patent Number: 5,787,595
[45] Date of Patent: Aug. 4, 1998

[54] METHOD AND APPARATUS FOR CONTROLLING FLATNESS OF POLISHED SEMICONDUCTOR WAFER

[75] Inventors: Ankur H. Desai; Troy W. Adcock, both of St. Charles; Michael S. Wisnieski, O'Fallon, all of Mo.; Harold E. Hall, Jr., Rougemont, N.C.

[73] Assignee: MEMC Electric Materials, Inc., St. Peters, Mo.

[21] Appl. No.: 689,432

[22] Filed: Aug. 9, 1996

[51] Int. Cl.⁶ ............................................. G01B 5/20
[52] U.S. Cl. ........................... 33/533; 33/551; 33/553
[58] Field of Search ......................... 33/533, 1 M, 286, 33/DIG. 21, 551, 553, 554, 555, 549

[56] References Cited

U.S. PATENT DOCUMENTS

| | | |
|---|---|---|
| 4,720,938 | 1/1988 | Gosis . |
| 5,068,972 | 12/1991 | Herzog et al. ................... 33/503 |
| 5,081,051 | 1/1992 | Mattingly et al. . |
| 5,154,021 | 10/1992 | Bombardier et al. . |
| 5,189,806 | 3/1993 | McMurtey et al. ................ 33/503 |
| 5,231,767 | 8/1993 | Brinley .......................... 33/553 |
| 5,338,932 | 8/1994 | Theodore et al. . |
| 5,421,768 | 6/1995 | Fujiwara et al. . |
| 5,456,627 | 10/1995 | Jackson et al. . |
| 5,617,645 | 4/1997 | Wick et al. ................... 33/DIG. 21 |

OTHER PUBLICATIONS

"Ultra High Accuracy Laser Displacement Meter, LC-2400A Series," Keyence Corporation of America, pp. 1–4, 1994.
"Technology Overview, Magne Rule Plus," Lucas, pp. 4, 8–9, (undated) (admitted prior art).
"Group 2 Systems, 2CB Superslide™, Twin Shaft Web System," pp. 67–68, undated (admitted prior art).

Primary Examiner—Christopher W. Fulton
Attorney, Agent, or Firm—Senniger, Powers, Leavitt & Roedel

[57] ABSTRACT

Apparatus for determining the flatness of a generally circular polishing pad through direct measurement of the pad for use in maintaining the flatness of the pad and the flatness of surfaces of articles polished on the polishing pad of a polisher. The apparatus includes a measuring device, a frame mounting the measuring device being capable of measuring a distance between an upper surface of the polishing pad and a reference plane at plural locations along the polishing pad. The apparatus further includes a controller for controlling the measuring device. The controller is configured to indicate whether the flatness of the pad falls outside a predetermined specification.

10 Claims, 6 Drawing Sheets

METHOD AND APPARATUS FOR CONTROLLING FLATNESS OF POLISHED SEMICONDUCTOR WAFER

BACKGROUND OF THE INVENTION

This invention relates to controlling the flatness of a polished semiconductor wafer. More specifically, this invention relates to an apparatus and method for determining the flatness of a polishing pad through direct measurement of the polishing pad to maintain the flatness of surfaces of the semiconductor wafers polished on the pad.

The final step in a conventional semiconductor wafer shaping process is a polishing step to produce a highly reflective, damage-free and flat surface on one face of the semiconductor wafer. Semiconductor wafers must be polished particularly flat in preparation for printing circuits on the wafers by an electron beam-lithographic or photolithographic process. Flatness of the wafer surface on which circuits are to be printed is critical in order to maintain resolution of the lines, which can be as thin as 1 micron or less.

Polishing of the semiconductor wafer is accomplished by a mechanochemical process in which a rotating polishing pad rubs a polishing slurry against the wafer. In a conventional semiconductor wafer polisher, a surface of the wafer is bonded with wax flat against a polishing block. The wafer and polishing block unit is then held with force by a polishing arm against a polishing surface (i.e., that portion of the upper surface area of the pad which contacts and polishes the wafer) of the rotating polishing pad. The polishing arm may also move the wafers across the polishing pad in an oscillatory fashion as the pad rotates underneath them. The rigid polishing block provides a reference plane with respect to which the polishing surface of the wafer is shaped by polishing to be an essentially parallel, flat plane. As a result, the opposing surfaces of the wafer are parallel to each other.

A typical rough polisher pad is made of polyester fibers impregnated with polyurethane resin. The pad structure remains sufficiently porous after impregnation of the fibers with resin to carry the slurry under the wafer. The pad may have a central opening, such that the pad has an annular shape. The slurry is typically comprised of a colloidal dispersion of ultrafine particles in an aqueous medium together with additives which stabilize the colloid. Other additives may also be used to increase chemical reactivity of the slurry so as to increase polishing rates.

The polishing pad must remain substantially flat in order to produce a wafer having a flat polished surface. However after a number of polishing cycles, the heat and pressure on the polishing pad causes a central annular region of the pad between its annular inner and outer edge margins to become compressed so that it is thinner than the inner and outer edge margins. Thus, the cross sectional profile of the polishing surface of the pad becomes concave. Wafers polished by a pad of concave cross section are shaped with polished surfaces which are more convex than flat. Accordingly, the polishing pad must be re-shaped to lower the inner and outer edge margins of the pad to the level of the central region by abrading away the inner and outer edge margins.

Presently, techniques for controlling the flatness of polished semiconductor wafers rely on measurements taken from the semiconductor wafers after they are polished. Adjustments are then made to the polishing pad based on the measurement data obtained from the semiconductor wafer, since the flatness of the polishing pad is directly correlated to the shape of the polished semiconductor wafer. A problem with this type of measurement system is production delays and yield loss of the semiconductor wafers polished by a polishing pad that is beyond acceptable flatness tolerances during the lag time between the measurement of the semiconductor wafers and the correction to the polishing pad.

SUMMARY OF THE INVENTION

Among the several objects of this invention may be noted the provision of an apparatus and method for directly measuring the shape of a polishing pad; the provision of such an apparatus and method which improves the yield of semiconductor wafers; the provision of such an apparatus and method which improves the rate of production of wafers; and the provision of such an apparatus and method that is simple and cost effective to use.

An apparatus of the present invention determines the flatness of a generally circular polishing pad through direct measurement of the pad for use in maintaining the flatness of the pad and the flatness of surfaces of semiconductor wafers polished on the polishing pad of a polisher. Generally, the apparatus includes a measuring device and a frame mounting the measuring device and constructed to extend over at least a portion of the polishing pad. The measuring device is capable of measuring a distance between an upper surface of the polishing pad and a reference plane at plural locations along the polishing pad portion. The apparatus further includes control means for controlling the measuring device to make the measurements at the plural locations. The control means is configured to indicate whether the flatness of the pad portion falls outside a predetermined specification.

In another aspect of the present invention, a method for determining the flatness of a generally circular polishing pad through direct measurement of the pad for use in maintaining the flatness of surfaces of articles polished on the polishing pad, includes the steps of determining the flatness of the polishing pad through direct measurement of the polishing pad and shaping the pad if the flatness of the polishing pad falls outside specification limits.

Other objects and features will be in part apparent and in part pointed out hereinafter.

BRIEF DESCRIPTION OF THE DRAWINGS

Corresponding parts are designated by corresponding reference numerals throughout the several views of the drawings.

DESCRIPTION OF THE PREFERRED EMBODIMENT

Figure 6:
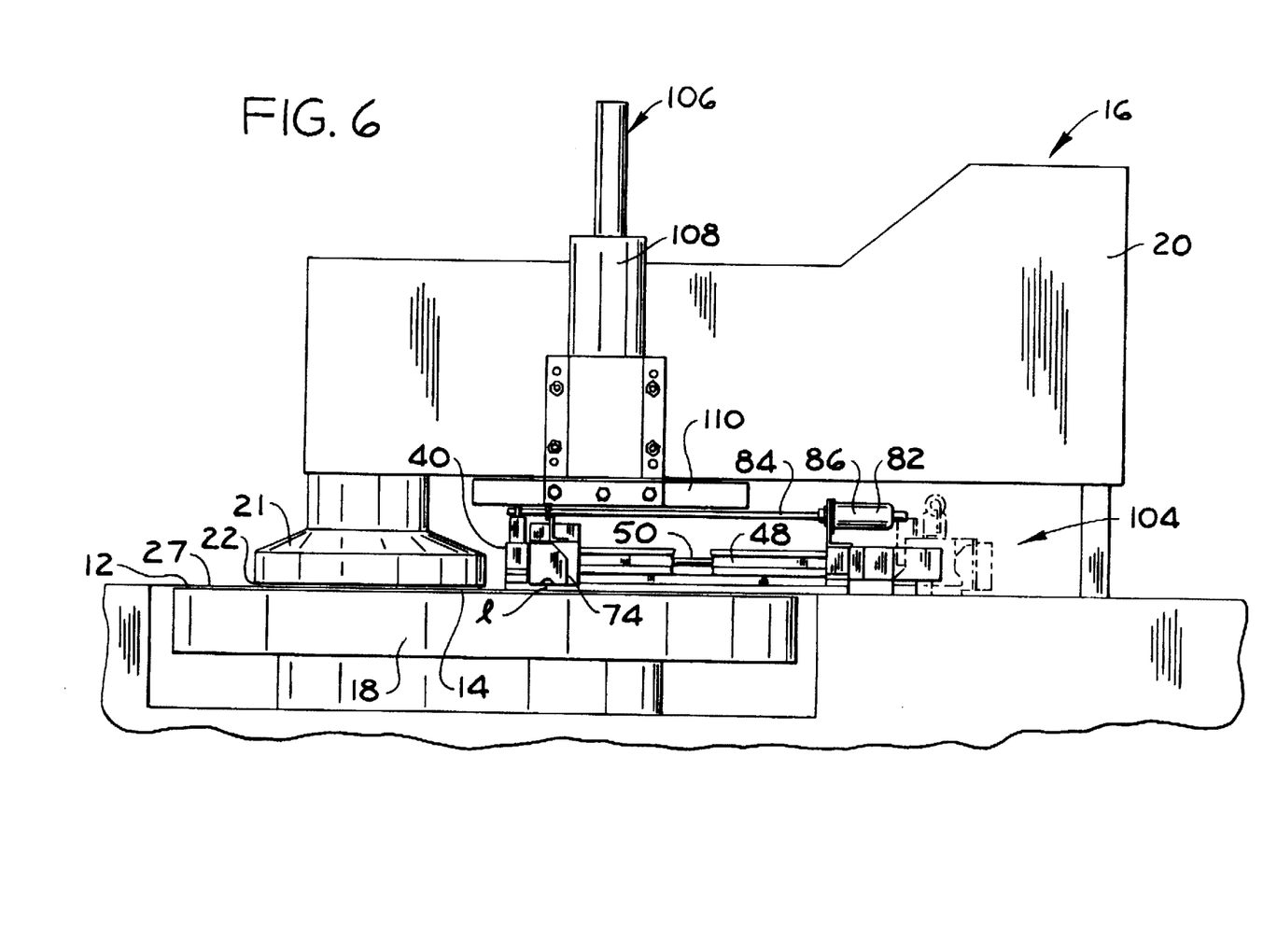
FIG. 6 is a front elevational view of a second embodiment of a measuring device shown mounted on a polishing pad on a polishing table.

Referring now to the drawings, and first to FIGS. 1–4, an apparatus for determining the flatness of a polishing pad is generally indicated at 10. The polishing pad 12 is used to polish semiconductor wafers 14 on a wafer polisher 16 (FIG. 6) in a way which is well known to those of ordinary skill in the art. The flatness of the semiconductor wafers 14 polished on the polishing pad 12 is directly correlated to the flatness of the polishing pad, thus by maintaining the polishing pad surface within acceptable flatness parameters, the semiconductor wafers polished on the pads will remain within acceptable flatness limits. The polishing pad 12 is located on a ceramic table 18 upon which the semiconductor wafer is placed for polishing. A simplified view of a semiconductor wafer polisher 16 is shown in FIG. 6. Although FIG. 6 illustrates a second embodiment of the present invention, the basic construction of the polisher 16 is the same for both embodiments. The polisher 16 comprises the ceramic table 18 supporting the polishing pad 12 and a polishing arm 20 for including a chuck 21 holding a polishing block 22 carrying the wafer and forcing the wafer 14 against the polishing pad as the pad rotates beneath it. Typically, a slurry is applied to the pad to facilitate polishing.

The apparatus 10 includes a frame and a measuring device, generally indicated at 24 and 26, respectively. The measuring device is capable of measuring a distance between an upper surface 27 of the polishing pad 12 and an arbitrary reference plane, indicated at P1 on FIGS. 2 and 3. A conveying mechanism 28 supports the measuring device 26 for movement lengthwise of the frame 24 over at least a portion of the polishing pad 12 generally in the reference plane P1. The conveying mechanism 28 and measuring device 26 travel across the polishing pad 12 to measure the distance from the pad surface 27 to the reference plane P1 at plural locations thereby to indicate the flatness of the pad.

The frame 24 includes a ceramic base 30 which is placed directly over the polishing pad 12. The base 30 also serves as a reference surface for the measuring device 26 which will be further discussed below. In the first embodiment, the base 30 is preferably sized to have a length slightly larger than the diameter of the polishing pad 12. For example, a base 30 having a length of 24 in., width of 4.25 in. and a height of 0.625 in. may be used with a polishing pad 12 having a diameter of 21.5 inches. For accurate measurement of the polishing pad upper surface 27, the base 30 preferably has a surface flatness of no greater than 0.0005 in. on its lower surface 32 which is in contact with the polishing pad 12 and 0.000012 in. on its upper surface 27 upon which the frame 24 is mounted. The base 30 includes four mounting holes on each end for receiving bolts 38 for connecting the frame 24 to the base 30. It is envisioned that an apparatus could be used without a base and still fall within the scope of the present invention.

Figure 1:
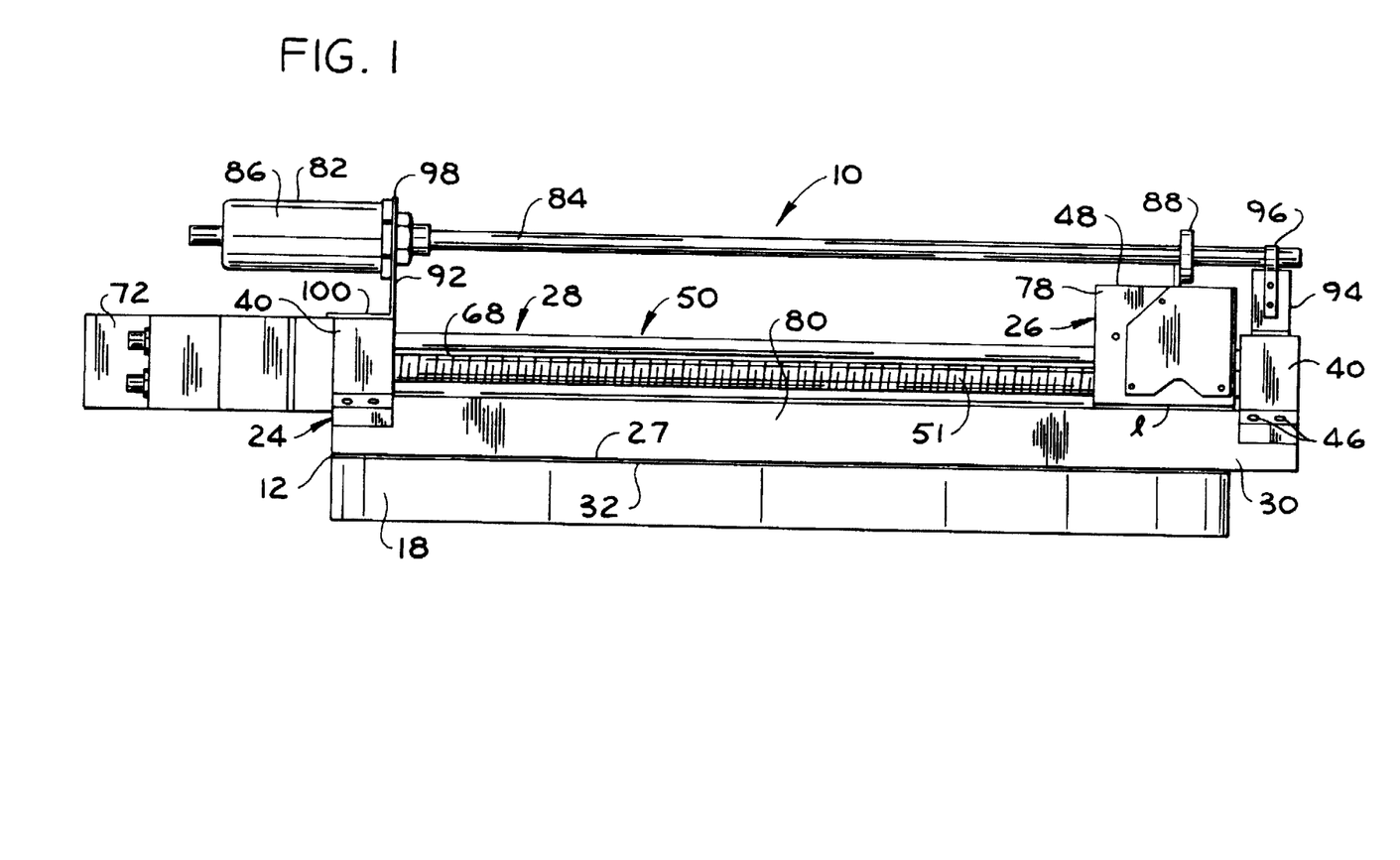
FIG. 1 is a front elevational view of an apparatus for determining the flatness of a polishing pad mounted on a polishing table.

Referring to FIG. 1, the frame 24 further includes two end supports 40 mounted on opposite ends of the base 30. Each end support 40 has a generally rectangular shaped portion 42 for supporting the conveying mechanism 28 and a mounting base 44 which includes four holes 46 for receiving the bolts 38 for attaching the end support 40 to the base 30. The end supports 40 may for example have a height of 2.62". and a width of 3.93". The conveying mechanism 28 comprises a carriage 48 and ball screw assembly 50. Each end of the ball screw assembly 50 is retained by an angular contact bearing 52 (FIG. 2) mounted in each end support 40.

Figure 2:
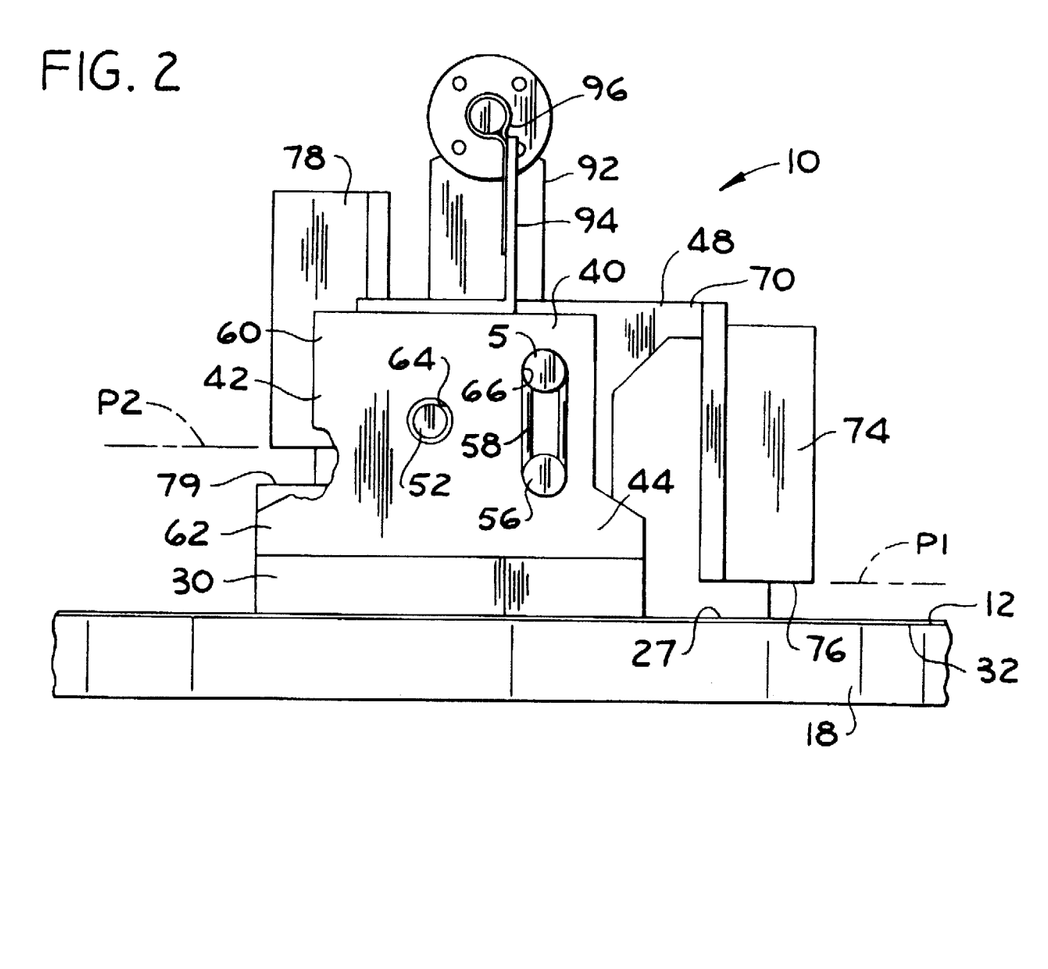
FIG. 2 is a right side elevational view of the apparatus of FIG. 1, portions being broken away to show detail.
Figure 3:
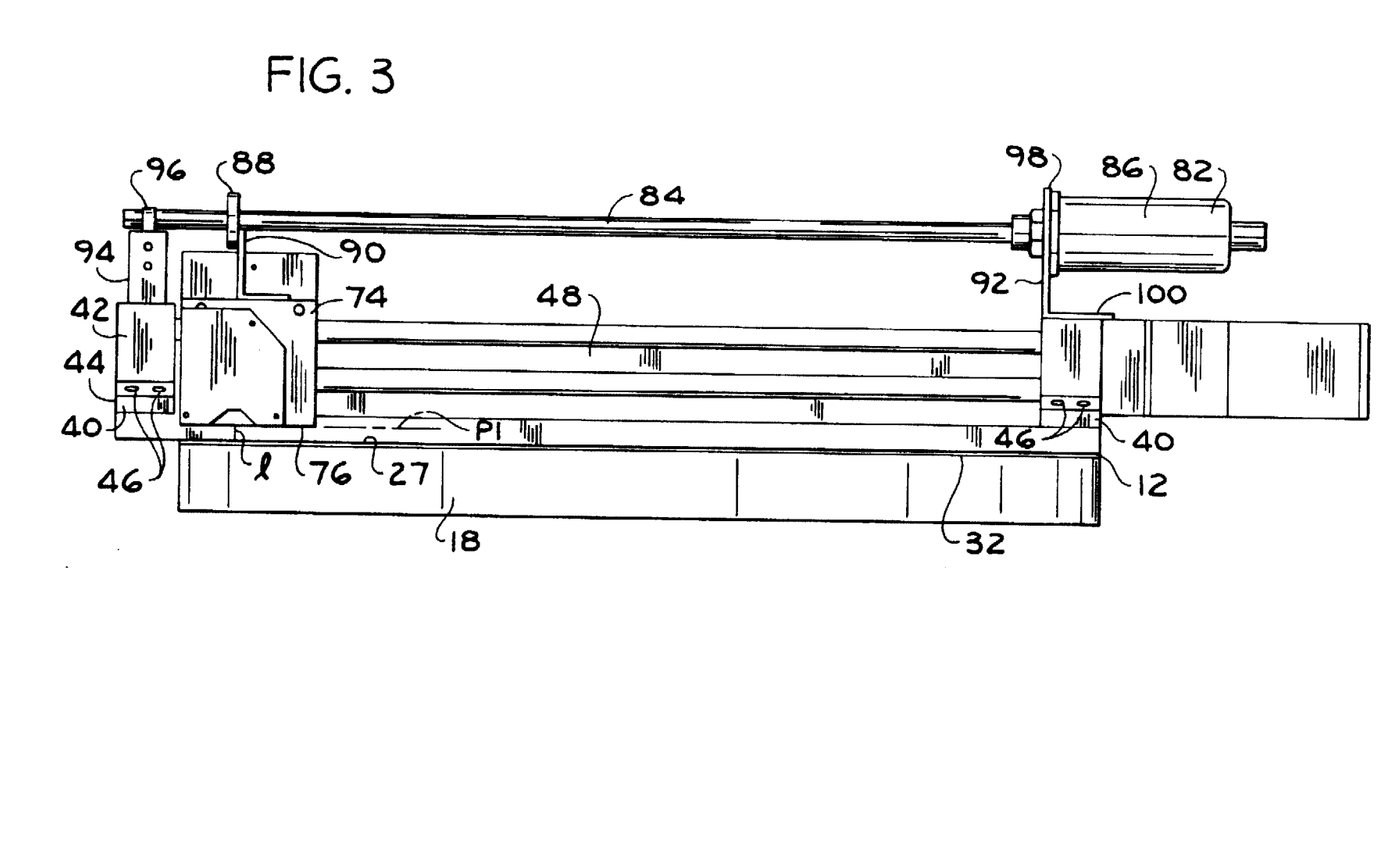
FIG. 3 is a rear elevational view of the apparatus of FIG. 1.

As shown in FIG. 2, the conveying mechanism 28 further includes two rods 56 connected by a web 58. The end support 40 has an upper portion 60 and a lower portion 62 having two openings 64, 66 aligned with corresponding openings (not shown) extending through the carriage 48 for receiving the ball screw 51, and rods 56 and web 58, respectively. The first opening 64 includes the bearings 52 for supporting the ball screw. The second opening 66 is shaped for receiving the rods 56 for sliding engagement of the carriage 48 on the slide member to provide support for the carriage and measuring device 26. The carriage 48 includes a flange 70 for connecting the measuring device 26 to the carriage. The flange 70 of the carriage 48 may for example have a width of 3" and a length of 3". The stroke of the ball screw 51 for the system described above is about 24". The ball screw assembly may be a device such as available from Thomson Industries, Inc. of Port Washington, N.Y. under model designation number 2CB08OVAFL24, Thomson Super Slide. It is to be understood that conveying mechanisms other than a ball screw arrangement may be used without departing from the scope of this invention.

An electric motor 72 is mounted to one end support 40 and coupled with the ball screw 51 for driving rotation of the ball screw. It is to be understood that other drive mechanisms such as a hydraulic motor or manual rotation may be used to rotate the ball screw 51 and move the carriage 48 without departing from the scope of this invention.

The measuring device 26 comprises a laser sensor 74 mounted to the flange 70 of the carriage 48 and is operated to measure the distance from the upper surface 27 of the polishing pad 12 to the reference plane P1 at plural locations to indicate the flatness of the pad. The laser sensor 74 emits a semiconductor laser beam 1 which bounces off the upper surface 27 of the polishing pad 12 and enters the sensor head 74 to provide a displacement measurement between the upper surface of the polishing pad and the sensor head. The distance is determined by the angle at which the laser beam reenters the sensor 74. A bottom surface 76 of the sensor 74 as it moves across the polishing pad 12 generally defines the reference plane P1 on FIG. 3. The flatness of the polishing pad 12 is determined by variations in the distance between the reference plane P1 and the upper surface 27 of the polishing pad. The measuring accuracy of the sensor 74 is preferably +0.2 μm at a distance of 10 mm or less. The laser sensor 74 may be one such as available from Keyence of New Jersey under model designation number LC-2400A for example. It is to be understood that other types of measurement devices may also be used to measure the flatness of the polishing pad 12 without departing from the scope of this invention.

Figure 4:
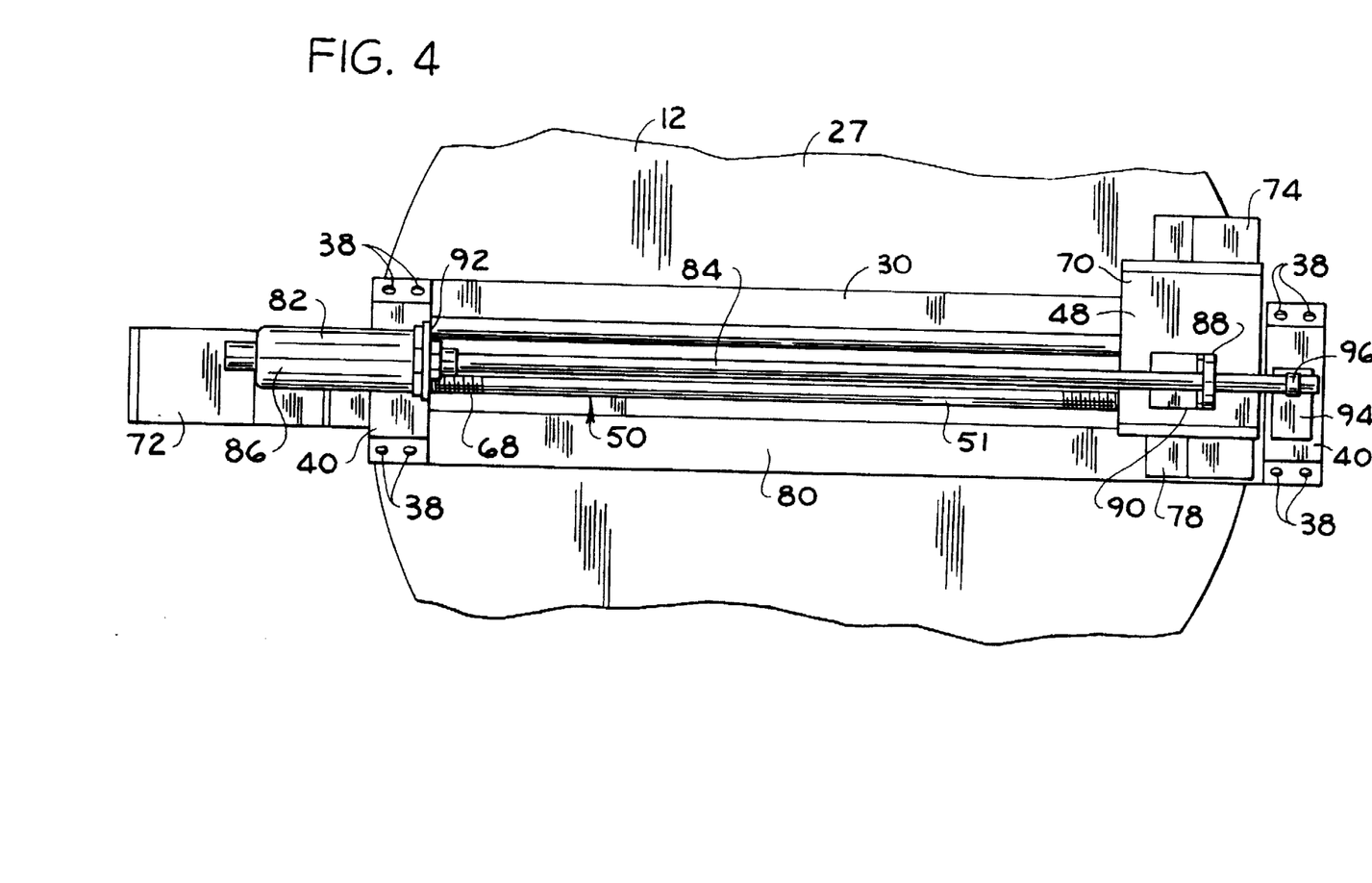
FIG. 4 is a top plan view of the apparatus of FIG. 1.

The measuring device 26 further comprises a second laser sensor 78 to improve the accuracy of the measuring device. Referring to FIG. 2, the second laser sensor 78 is used to measure a second distance between an upper surface 79 of a reference portion 80 of the base 30 and a second reference plane P2 to compensate for any deflection of the ball screw 51 and carriage 48. The reference portion 80 of the base 30 extends along the majority of the base but does not extend into the ends of the base where the end supports 40 are mounted (FIG. 4). The second laser sensor 78 is mounted on the flange 70 of the carriage 48 on the side opposite on which the first laser sensor 74 is mounted. The first and second lasers 74, 78 move together so that the second laser can detect whether the first sensor moves out of the reference plane P1 to compensate for deflection of the conveying mechanism. For example, if the first sensor 74 senses an increase in displacement from the upper surface 27 of the polishing pad to the first reference plane P1 and this increase is due to deflection of the carriage 48 or irregularities on the bottom surface of the reference base 30, the second sensor 78 will sense the same increase in displacement and will input a similar displacement to the controller which will cancel out the increase in displacement measured by the first sensor. If, however, only the first sensor 74 measures an increase in displacement, it will be interpreted as being due to concavity of the upper surface 27 of the polishing pad.

The apparatus 10 for measuring the flatness of the polishing pad 12 further includes a position indicator for determining the lengthwise position of the laser sensor 74, relative to the frame 24. The position indicator is a linear displacement transducer 82 having a nonmagnetic, pressure-sealed stainless steel tube 84 (probe) welded to an enclosed stainless steel base 86. The probe 84 contains a stretched magnetostrictive wire, and the base 86 contains the transducer's control electronics. A permanent magnet ring 88 is provided to slide over the outside of the probe 84 to identify the position of the carriage 48. The magnetic ring 88 is connected to the carriage 48 by a bracket 90 and moves along with the carriage to indicate the position of the laser sensor 74. The base 86 of the transducer 82 is mounted by a transducer bracket 92 to the same end support 40 which the motor 72 is mounted. A probe bracket 94 and retainer band 96 are provided to mount the end of the probe 84 to the other end support 40. The retainer band 96 is wrapped around the probe 84 and attached to the upper portion 98 of the L-shaped tube bracket 94. The lower end 100 of the probe bracket 94 is attached to the upper portion 42 of the end support 40. The transducer 82 may be a device such as one available from Lucas Control Systems Products Schaevitz™ Sensors of Hampton, Va. under model designation number MRU-300-018.

Figure 5:
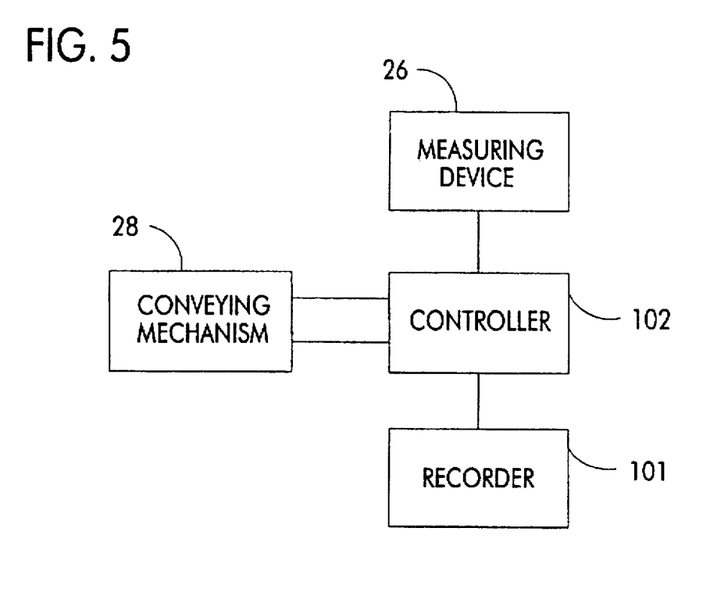
FIG. 5 is a block diagram of the apparatus of FIG. 1

A controller 102, such as a microprocessor is used for controlling the electric motor 72 to move the carriage 48 and laser sensors 74, 78 lengthwise of the frame 24. The interconnection between the controller 102, transducer 82 and laser sensors 74, 78 is schematically illustrated in FIG. 5. The controller 102 is configured to record the lengthwise position of the laser sensors 74, 78 correlated with the distance measured thereby to show the flatness of the upper surface 27 of the polishing pad 12. The controller 102 will receive input from the transducer 82 and the laser sensors 74, 78 and combine them to provide an output in either digital or graphical form to show the flatness of the upper surface of the polishing pad. The information may be recorded on a recorder 101 such as a x-y plotter or any other suitable device for analysis by an operator. Data may also be provided to a controller or to an operator in analog form as two or more discrete measurements of the distance between the upper surface 27 of the polishing pad 12 and the reference plane P1. If these measurements vary by more than a specified limit the pad will be shaped to obtain an acceptable flatness. In the first embodiment, the indication that the flatness of the pad 12 is out of (or within) the predetermined flatness specification is given by the plot made by the x-y platter. However, the indication that pad flatness is out of specification may be in the form of a signal provided to a pad shaping device (discussed hereinafter) or simply a display of measured distances recorded by a technician without departing from the scope of the present invention.

In use, the apparatus 10 is placed on the polishing pad 12. The motor 72 is operated by the controller 102 to move the carriage and attached laser sensors 74, 78 across substantially the full diameter of the pad 12. The data correlating the position of the laser sensor 74 along with the distance between the reference plane P1 and the upper surface 27 of the polishing pad 12 (as corrected by information from laser sensor 78) is used to determine whether the polishing pad 12 has a flatness within acceptable limits. If the polishing pad 12 has an acceptable flatness, the next semiconductor wafer is polished. If the flatness is not within acceptable limits, shaping is performed on the pad 12 to bring it into acceptable limits. Shaping may be accomplished in a suitable manner such as by manually using hand held abrading blocks, a shaping device like the one disclosed in copending U.S. patent application Ser. No. 08/639,185, or automatic shaping devices as discussed below. Measurement of the polishing pad may also be done on a sampling rate to obtain statistical data to determine the optimum number of semiconductor wafers which can be polished between measuring and shaping of the polishing pad.

Figure 7:
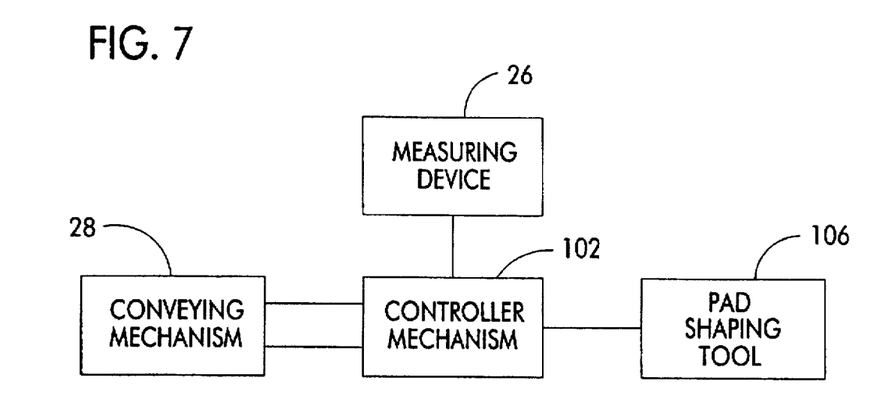
FIG. 7 is a block diagram of the apparatus of FIG. 6.

A second embodiment of this invention, generally indicated at 104 in FIG. 6, is attached directly to the wafer polisher 16 and is used to provide information on the flatness of the polishing pad 12 to the controller 102 which outputs data directly to a pad shaping tool 106 attached to the polishing arm 20 to provide automatic measuring and shaping of the polishing pad. The pad shaping tool 106 includes a pneumatically controlled cylinder 108 for lowering a shaping pad 110 onto the polishing pad 12 and forcing the shaping pad against the polishing pad as the pad rotates beneath it to correct the flatness of the polishing pad. The material of the shaping pad 110 may be the same material as the polishing pad 12 or any other suitable material. The pad shaping tool 106 includes a pressure regulator (not shown) so that the force applied to shape the polishing pad can be adjusted. During polishing operations or while measurements of the polishing pad 12 are being taken, the pad shaping tool 110 is held by the air cylinder 108 in a storage position, as shown in FIG. 6. The apparatus 104 for measuring the polishing pad 12 is pivotally mounted to table 18 and may be automatically swung away from the polishing pad to a position (shown in phantom) during polishing and shaping operations. Pivotal movement of the apparatus may be accomplished by a cylinder, motor or other suitable actuator (not shown). The apparatus 104 is substantially the same as the apparatus of the first embodiment but extends over only half of the pad 12. The same reference numerals are used to identify corresponding parts of the apparatus 104 of the second embodiment. The data received from the laser sensors 74, 78 and transducer 82 may be input directly to the pad shaping tool 106 for reshaping the pad as required. A block diagram of the interface between the laser sensors 74, 78, transducer 82, pad shaping tool 110 and controller 102 is shown in FIG. 7.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for determining the flatness of a generally circular polishing pad through direct measurement of the pad for use in maintaining the flatness of the pad and the flatness of surfaces of articles polished on the polishing pad of a polisher, the apparatus comprising a measuring device, a frame mounting the measuring device and constructed to extend over at least a portion of the polishing pad, the measuring device being capable of measuring a distance between an upper surface of the polishing pad and a reference plane at plural locations along said polishing pad portion, control means for controlling the measuring device to make the measurements at said plural locations, said control means being configured to indicate whether the flatness of said pad portion falls outside a predetermined specification, and a conveying mechanism mounted on the frame and supporting the measuring device for movement lengthwise of the frame over said polishing pad portion generally in the reference plane, the control means being configured to activate the conveying mechanism to move the measuring device over said pad portion and to operate the measuring device to measure the distance from the pad to the reference plane as the measuring device moves over said pad portion thereby to indicate the flatness of said pad portion, said frame including a reference base having a flat upper surface, said measuring device being further constructed for measuring a distance between the upper surface of the reference base and the reference plane at the same time it measures the distance from the polishing pad portion to the reference plane, said control means being configured to receive the measurements from the measuring device and use the measurements of the distance from the measuring device to the reference base upper surface to compensate for any movement of the measuring device out of the reference plane.

2. Apparatus as set forth in claim 1 wherein the measuring device comprises first and second laser sensors mounted for conjoint movement by the conveying mechanism over the polishing pad portion, the first laser sensor being arranged for measuring the distance between the first laser sensor and the pad portion and the second laser sensor being arranged for measuring the distance between the reference base upper surface and the reference plane.

3. Apparatus as set forth in claim 1 further comprising a position indicator for signalling the lengthwise position of the measuring device to said control means.

4. Apparatus as set forth in claim 3 wherein said control means is configured to record the lengthwise position of the measuring device correlated with the distance measured thereby to determine the flatness of the upper surface of the polishing pad.

5. Apparatus as set forth in claim 1 in combination with an automatic pad shaping device adapted for mounting on the polisher, said control means being configured to activate the automatic pad shaping device when the measured flatness of the polishing pad portion falls outside the specification.

6. Apparatus as set forth in claim 5 wherein the apparatus is adapted for mounting on the polisher for movement relative to the polisher between a use position and a stowed position.

7. Apparatus as set forth in claim 1 in combination with the polisher and an automatic pad shaping device, the apparatus being mounted on the polisher for disposing the measuring device over said polishing pad portion, and further in combination with an automatic pad dressing device mounted on the polisher, said control means being configured to activate the automatic pad shaping device when the measured flatness of the polishing pad portion falls outside the specification.

8. Apparatus as set forth in claim 7 wherein the apparatus is mounted on the polisher for movement relative to the polisher between a use position and a stowed position.

9. A method for determining the flatness of a generally circular polishing pad through direct measurement of the pad for use in maintaining the flatness of the pad and the flatness of surfaces of articles polished on the polishing pad, the method comprising the steps of determining the flatness of the polishing pad through direct measurement of the polishing pad and shaping the pad if the flatness of the polishing pad falls outside specification limits, the step of determining the flatness of the polishing pad including measuring a distance between an upper surface of the polishing pad and a reference plane with a measuring device, actuating the measuring device to move over at least a portion of the polishing pad to measure the distance from the pad to the reference plane at plural locations thereby to indicate the flatness of said pad portion, said step of determining the flatness of the polishing pad further including measuring a distance between an upper surface of a reference base of the measuring device and the reference plane at the same time the device measures the distance from the upper surface of the polishing pad to the reference plane for use in compensating for any movement of the measuring device out of the reference plane.

10. A method as set forth in claim 9 further comprising providing the distance from the pad to the reference plane and the location along the pad at which the distance is measured to a pad shaper for shaping the pad.

* * * * *